United States Patent [19]

Specktor et al.

[11] Patent Number: 4,684,150
[45] Date of Patent: Aug. 4, 1987

[54] APPARATUS FOR ADJUSTING CAMBER AND TOE

[75] Inventors: John Specktor, Golden Valley; Gerald A. Specktor, St. Paul, both of Minn.

[73] Assignee: Shim-A-Line, Inc., Minneapolis, Minn.

[21] Appl. No.: 546,848

[22] Filed: Oct. 31, 1983

[51] Int. Cl.[4] ............................................. B62D 17/00
[52] U.S. Cl. .................................. 280/661; 384/626; 403/4; 403/98; 411/535; D8/354
[58] Field of Search ............... 280/661; 180/253, 254; 188/201, 196 V, 196 M, 196 B, 1.11, 79.5; 384/626, 267; 301/128, 131, 132; 403/4, 365, 366, 367, 368, 369, 98; 248/188.2; 411/535; D8/354, 399; D12/13

[56] References Cited

U.S. PATENT DOCUMENTS

| D. 272,392 | 1/1984 | Bigelow | D8/354 |
|---|---|---|---|
| D. 275,551 | 9/1984 | Bigelow | D8/354 |
| 774,042 | 11/1904 | Cooper | 301/132 |
| 776,971 | 12/1904 | Walsh | 285/184 |
| 1,332,626 | 3/1920 | Henegar | 411/539 |
| 1,492,561 | 5/1924 | Gabriel | 411/539 |
| 2,037,961 | 4/1936 | Boden | 74/713 |
| 2,281,555 | 5/1942 | Castiglia | 280/661 |
| 2,431,342 | 11/1947 | Perkins | 493/462 |
| 2,772,596 | 12/1956 | Trussell | 411/535 |
| 2,978,253 | 4/1961 | Weiss et al. | 280/661 |
| 3,142,352 | 7/1964 | Johnansson | 180/22 |
| 4,037,680 | 7/1977 | Grove | 180/254 |
| 4,160,561 | 7/1979 | Farnam et al. | 293/1 |
| 4,195,862 | 4/1980 | Specktor et al. | 280/661 |
| 4,420,272 | 12/1983 | Ingalls et al. | 403/4 |

OTHER PUBLICATIONS

"Dog Tracking-1980 and 1981 'X' Series," Zone Technical Bulletin of Pontiac Motors Division of General Motors Corporation, No. 81-ZT-29 dated 9/81.
"Rear Wheel Alignment-Chevrolet X and J Cars," brochure of Specialty Products Company of Longmont, Colo.
Ingalls Engineering Company, Inc., Longmont, CO 80501, specialty catalog #840, 1984.
Dana-Napa supplemental catalog #CH-M33A, Jul. 1983.

Primary Examiner—John J. Love
Assistant Examiner—Mitchell J. Hill
Attorney, Agent, or Firm—Kinney & Lange

[57] ABSTRACT

A camber and toe arrangement includes an improved shim device that adjusts both the camber and toe of a motor vehicle wheel. The shim device includes a tapered plate having a plurality of spaced apart bolt-engaging notches around the periphery. The bolt-engaging notches permit the shim device to be inserted between the wheel and the axis without removing the wheel mount and permit the shim device to be rotated so that the position of the taper is adjustable for correction of both toe and camber. The shim is inserted between the axle and the wheel mount by loosening all the bolts and removing two of the bolts, inserting the shim in the desired position and so that the remaining bolts engaging the bolt-engaging notches of the shim, inserting back the two bolts that were removed, and tightening all four bolts.

10 Claims, 6 Drawing Figures

U.S. Patent  Aug. 4, 1987  Sheet 1 of 2  4,684,150
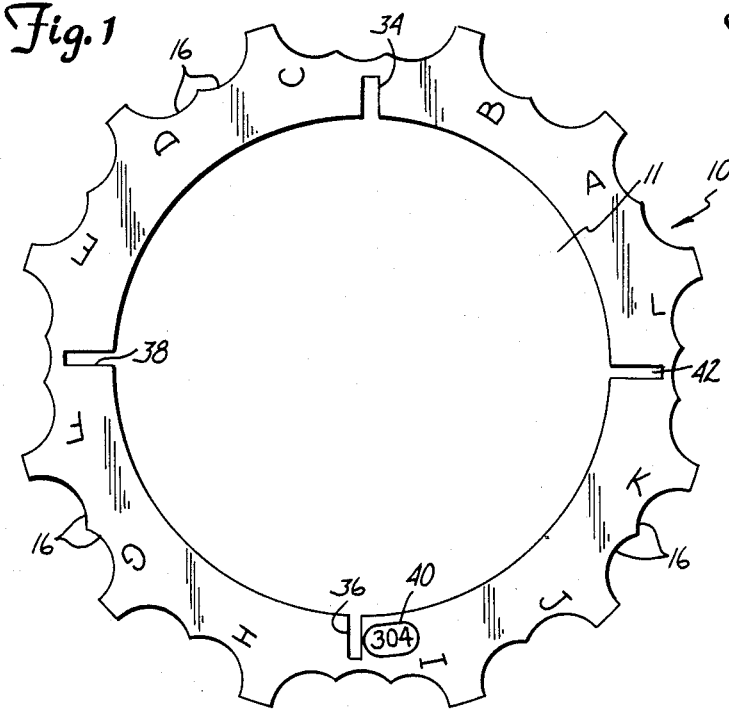
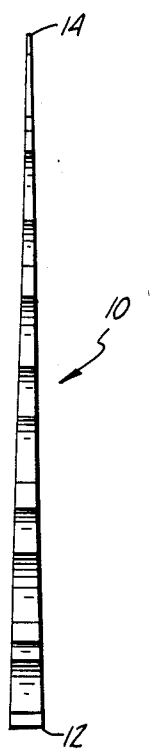
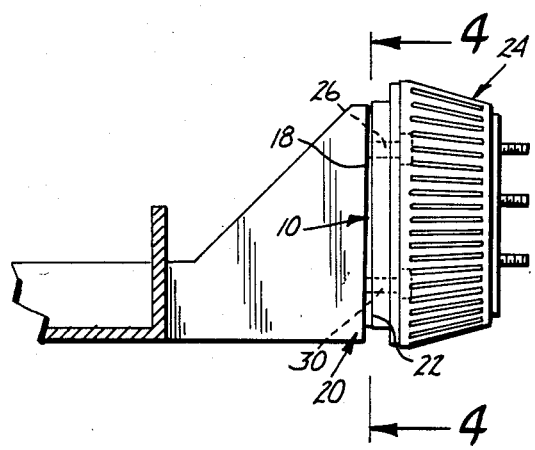
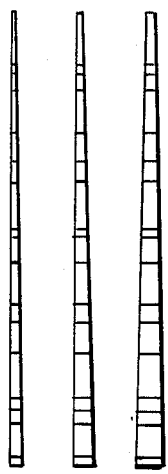
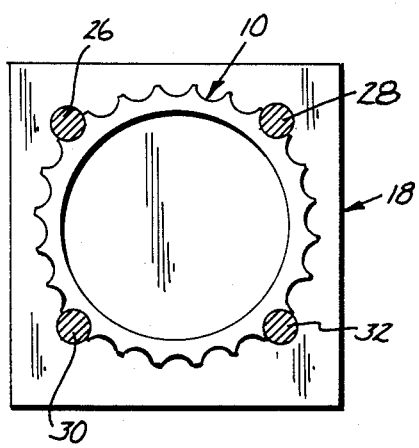

Fig.5

APPARATUS FOR ADJUSTING CAMBER AND TOE

BACKGROUND OF THE INVENTION

1. Field of the Invention

The present invention relates to shims that are used to correct camber and toe of a vehicle wheel, and in particular, it relates to a shim device that can be installed without removing the wheel mount from the axle and can be angularly indexed to adjust the position of the taper of the shim for correction of both camber and toe.

2. Description of the Prior Art

There have been various attempts at producing a shim to correct camber of a vehicle wheel. Improper camber increases tire wear significantly.

Shims are well known in the art as evidenced by the following patents:

The Farnam et al U.S. Pat. No. 4,160,561 describes a shim that is clamped between a component of a vehicle bumper assembly and a support member on a vehicle to provide desired spacing for bumper alignment. The Perkins U.S. Pat. No. 2,431,342 describes a shim device having a slot for use in machines wherein the shim is used as a spacer around a cap screw. The Castiglia U.S. Pat. No. 2,281,555 shows an annular tapered shim used to correct misalignment of knee action wheel mounts in a motor vehicle. The Boden U.S. Pat. No. 2,037,961 describes shims that are used to help mount the tapered roller bearings in an automobile differential mechanism. The shims have an arcuate configuration and are provided with deep notches. The notches engage the cap screws when in a slackened position and are inserted without removing the cap screws. The Walsh U.S. Pat. No. 776,971 shows an annular tapered part coupling which permits sections of unaligned pipe to be connected. However, none of the immediately above-mentioned patents describe shim devices suitable for mounting between an end plate of an axle and the wheel mount of a motor vehicle to adjust camber.

The Trussell U.S. Pat. No. 2,772,596 describes a shim arrangement used for adjusting both the camber and caster of an automobile. The shims are rectangularly-shaped tapered plates having a slot extending along the longitudinal axis of the plate. The shim is inserted so that the slot engages the bolt that holds the wheel onto the end plate of the axle. The portion of the shim that sticks out can be broken away along transversely positioned slots on the shim. Two shims can be used to interact with each other to correct both camber and caster. However, the correction of both camber and caster using the shim arrangement described in the Trussell Patent is very much a trial and error procedure with the shims having to be moved around until the desired camber and caster are achieved.

The Weiss et al U.S. Pat. No. 2,978,253 also has longitudinally slotted shims for correcting caster and camber by adjustment of the wheel suspension. Correction of camber and caster using the device of the Weiss Patent is also a trial and error procedure.

The Cooper U.S. Pat. No. 774,042 describes annularly shaped tapered shims for non-driven axles which may be rotated, coacting with each other providing a desired angle in the axle. The shims of the Cooper Patent, however, are not suitable for today's modern vehicles.

The Grove U.S. Pat. No. 4,037,680 describes a tapered annular ring having a plurality of bolt holes that is used as a shim for adjusting the camber between a spindle and the end plate of an axle. The openings are positioned to correspond to the position of the bolts that hold the spindle onto the end plate of the axle. The wheel and spindle is removed and the shim with tapered end down is positioned so that the bolts extend through the holes.

Similarly, the Specktor et al U.S. Pat. No. 4,195,862, assigned to the same assignee as the present application, describes an annularly tapered ring that is used as a shim to adjust camber between a wheel and an axle.

SUMMARY OF THE INVENTION

The present invention includes an apparatus having a shim device that adjusts camber or toe of a wheel mount attached to the end plate of an axle. The shim device has a flat tapered body with a peripheral surface having a plurality of outwardly facing irregularly spaced bolt-engaging notches. The bolt-engaging notches are spaced around the peripheral surface for engaging the bolts when the shim device is installed. The bolt-engaging notches permit the shim to be installed without removing the wheel mount from the axle.

Indicia are provided along selected bolt-engaging notches and provide a guide for positioning the taper of the shim so that the shim can be used for both camber and toe. A plurality of shims are included with each shim having a different degree of taper. A chart relates the desired adjustments of camber and toe to a shim having the proper taper. The chart also indicates the position of the taper relative to a reference bolt so that the shim can be properly angularly positioned to adjust for camber and toe.

BRIEF DESCRIPTION OF THE DRAWINGS

FIG. 1 is a plan view of a shim device of the present invention.

FIG. 2 is a side view of the shim device of the present invention.

FIG. 3 is a plan view of a wheel mount and an axle assembly with the shim device of the present invention installed.

FIG. 4 is a cross-sectional view of the wheel mount and axle assembly with the shim device installed, taken along the line 4—4 in FIG. 3.

FIG. 4A is a side view of a plurality of shims, each shim having a different taper.

FIG. 5 is a plan view of a chart relating camber and toe adjustment to a plurality of shims, each shim having a different taper.

DETAILED DESCRIPTION OF THE PREFERRED EMBODIMENTS

One form of shim device of the present invention is generally indicated at 10 in FIG. 1. The shim device 10 is a plate with a preferred annular configuration having a central opening 11. The device 10 is tapered from a lower thick end 12 to an upper thin end 14, as illustrated in FIG. 2. The terms "lower" and "upper" as used herein to indicate the relative position of the shim device 10 in the figures and are not intended to limit the device in any way. The device 10 has a plurality of outwardly-extending bolt-engaging notches 16 disposed around the periphery. The bolt-engaging notches are preferably arcuately configured so that their edges retain the shim upon installation as will be discussed subsequently.

The shim device 10 of the present invention is used to adjust either camber or toe and preferably both camber and toe of a wheel mounted to an axle of a motor vehicle, and particularly, the rear wheels of a front-wheel drive vehicle. The shim is inserted between an end plate 18 of an axle assembly 20 and a wheel hub backer plate 22 of a wheel mount assembly 24, as illustrated in FIG. 3. The wheel mount assembly 24 is attached to the axle assembly by bolts 26, 28, 30 and 32, as illustrated in FIGS. 3 and 4.

For purposes of this application, camber is defined as the vertical incline of the tires and is described in angular degrees. Toe, as used in the present application, defines side-to-side slant of the tires along their forward portion and is described in fraction of inches from a reference line positioned along an axis common to the front and rear tires.

The shim device 10 is formed of any suitable material, plastic or metal, having sufficient resilience and strength. A preferred material is aluminum. The device 10 is preferably formed by tapered sanding of flat stock due to the economics. The device can also be formed by stamping or any other machining process or combination of processes.

The shim device 10 is installed without removing the wheel mount assembly 24. In the arrangement illustrated in FIG. 4, all four bolts are loosened and only two of the bolts, for example, bolts 28 and 32, are removed. The shim device 10 is then inserted between the end plate 18 and the wheel hub backer plate 22. The shim device 10 is rotatable so that the position of the taper can be changed to adjust both camber and toe. The shim device is held in place by the bolt-engaging slots 16 abutting against the corresponding bolts. The bolts 28 and 32 that were removed are reinserted and all four bolts tightened. After tightening, all four bolts engage the edges of the bolt-engaging slots, securely holding the shim device in place. The bolt-engaging notches 16 retain the shim device in place even though one or more of the bolts, or all of the bolts, are loose.

It will be noted that the bolt engaging notches 16 are very irregular in shape and are variably spaced. Thus, the bolt engaging notch between letters D and C consists of two adjacent portions, either of which may engage a bolt. In the notch between letters C and B, there are three such adjacent bolt engaging notches. The bolt engaging notches are thus variably spaced throughout the periphery of the cam. The reason for this is that bolts for attaching the wheel mount assembly to the axle assembly are conventionally non-uniformly spaced. If the shim simply had uniformly spaced notches, as the shim was turned, certain notches would not align with bolts. It is for this reason that the notches are non-uniformly spaced so that with any conventional spacing of bolts, there are always notches that will engage the four bolts when a particular notch has been placed adjacent a reference bolt, regardless of the angular position in which the shim is placed.

In the embodiment of FIG. 1, the shim device 10 includes at least one set of diametrically opposed notches 34 and 36, as illustrated in FIG. 1. Preferably, the shim device includes a second set of notches 38 and 42 disposed 90° from the notches 34 and 36. The notches extend sufficiently far into the shim device 10 so that the shim device can be easily cut into two pieces using a pair of shears. Although notches are specifically shown in FIG. 1, it should be understood that score lines or other methods permitting the shim to be cut or broken in two (depending on the type of material the shim device is made of) are also includable within the scope of the present invention.

Breaking the shim device into two pieces permits installation of the shim device in arrangements where the axle and wheel assembly have a sealed rotary bearing (not shown) extending through the plane of the shim device. The shim device 10 is broken or cut in half and each half installed separately without removing the wheel mount. In a four-bolt arrangement, all the bolts that hold the wheel onto the end of the axle are loosened and two bolts are removed. The other two bolts retain the wheel mount assembly on the axle assembly. The first half of the shim is inserted and the two bolts are reinserted to retain the first half of the shim device. The other two bolts are then removed and the second half is inserted. The other two bolts are reinserted and all the bolts are tightened.

Both sets of notches 34 and 36, 38 and 42, are preferably included so that the shim device can be broken into pieces that are insertable from the sides of the wheel mount assembly regardless of the angular position of the taper. Installation of the shim from the top or the bottom of the wheel assembly is very difficult.

The present invention includes a shim arrangement in which the camber and toe are easily adjusted once a proper reading of the existing camber and toe of the vehicle are determined. A series of shim devices are provided with each shim device having a different taper. An example of one such series of shim devices is set forth in Table 1 below. Each differently tapered shim device is identified by a number that is stamped on the shim, as illustrated in FIG. 1 by reference character 40. Alternatively, the differently tapered shims are identified by different colors.

In FIG. 4A, three such shims are shown. As pointed out in the following table, however, there will normally be more of such shims.

TABLE 1

| I.D. Number | Thin Edge | Thick Edge |
|---|---|---|
| 301 | .015 | .030 |
| 302 | .015 | .045 |
| 303 | .015 | .061 |
| 304 | .015 | .076 |
| 305 | .015 | .091 |
| 306 | .015 | .106 |

Figure 5:
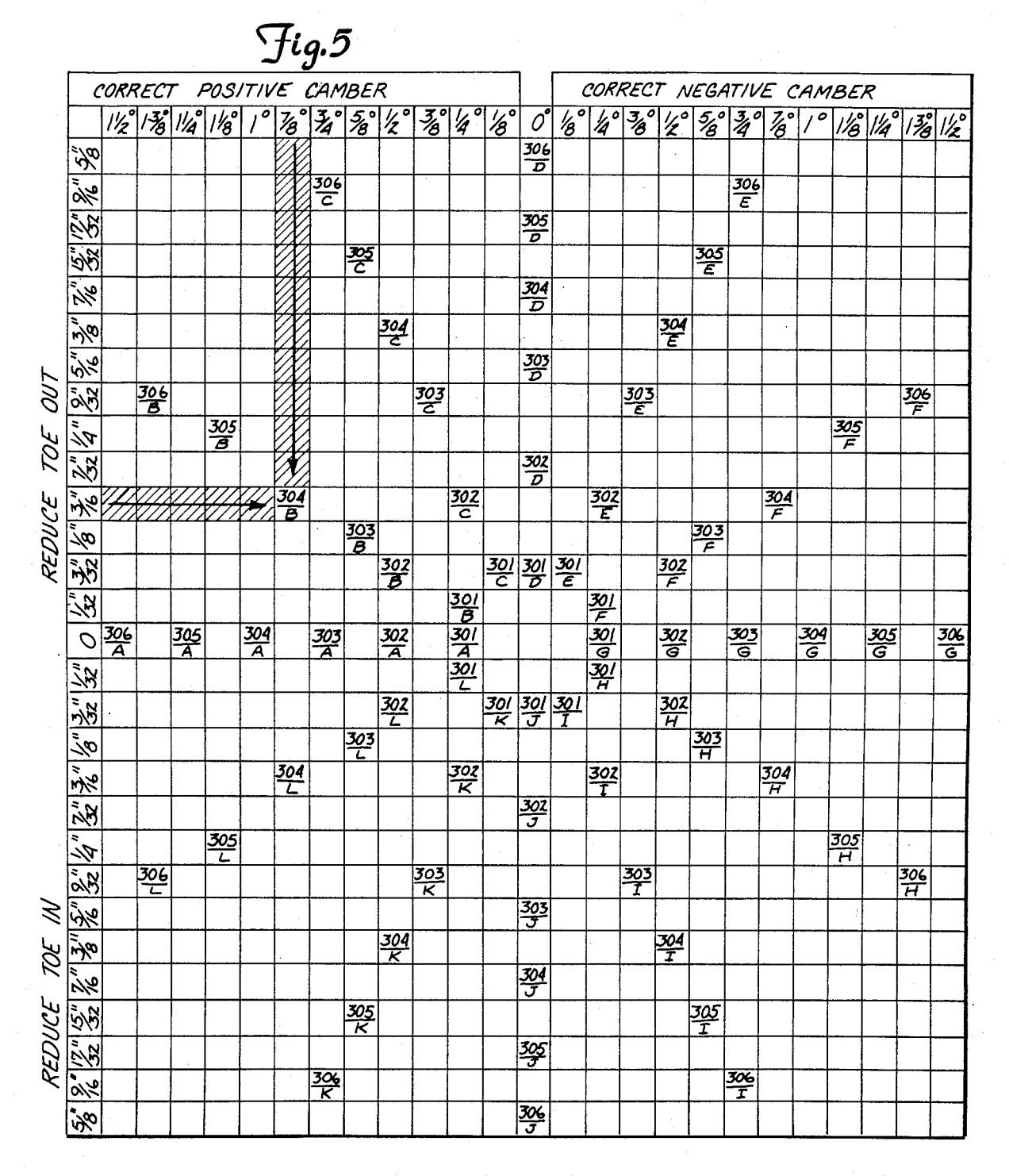

In FIG. 5, a chart is illustrated that relates adjustments in camber and adjustments in toe to a particular shim in the series in Table 1. The chart also indicates the proper angular position of the taper for the desired adjustment of both camber and toe with respect to a bolt. The taper of each shim in the series was designed to produce the incremental adjustments of camber and toe that are shown in the chart in FIG. 5.

At selected angular positions on the shim corresponding to selected bolt-engaging notches 16, indicia are provided to identify the selected bolt-engaging notches 16. The indicia identifying the notches 16 are used to determine the angular position of the taper with respect to a reference bolt. For example, in the embodiment shown in FIG. 1, the letter "A" is adjacent a selected bolt-engaging notch 16a. The notch 16a was selected so that when the notch 16a engages the upper right-hand bolt 28 (reference bolt), the taper of the shim device is positioned to substantially vertically. Positioning the shim device 10 so that the notch identified by the letter "B" engages the bolt 28 will position the taper to point to the right. Because of the irregular spacing of the notches, there will always be a notch engaging each bolt.

A chart, illustrated in FIG. 5, relates both camber and toe adjustments to a shim of a particular taper. In addition, the chart indicates the relative angular position of the shim in relation to a reference bolt, as described above. The chart in FIG. 5 includes incremental adjustments for positive and negative camber along a horizontal axis. Along the vertical axis, adjustments in toe described in terms of "toe-in" and "toe-out" are positioned in increments of 1/32 of an inch. The term "toe-in" refers to a forward portion of the tire pointing inwardly, while the term "toe-out" refers to the tires pointing outwardly.

Between the horizontal and vertical axis, the chart includes a grid structure having vertical and horizontal rows of blocks. Each increment of camber along the horizontal axis has associated with it a vertical row of blocks. Likewise, each increment of toe has associated with it a horizontal row of blocks. In selected blocks in the grid are disposed means for identifying a shim with a particular taper, such as indicia or color. In the chart shown, a three-figure number is used to indicate the shim. This three-figure number is identified by reference character 40 on the shim in FIG. 1, as previously described. Also included in the associated block is the letter which identifies the proper angular position of the taper to achieve a preselected camber and/or toe adjustment. To use the chart, the desired adjustment and camber is found along the horizontal axis and the desired adjustment and toe is found along the vertical axis. A block common to both the preselected camber adjustment and the preselected toe adjustment indicates which shim should be used to achieve the adjustments in toe and camber.

In a specific example, if the desired positive camber position is a positive camber of $\frac{1}{8}°$ and the desired toe position is a toe-in of 1/32" on a right rear wheel, and the present camber of the wheel is 1° positive camber and the toe-out is 5/32", the camber needs to be adjusted $\frac{7}{8}°$ and the toe-out needs to be reduced by 3/16". $1\frac{62}{8}°$ positive camber and 3/16" toe-out are located on the chart in FIG. 5 in the appropriate boxes along the corresponding axes. As indicated by the shading, the vertical row of boxes corresponding to the $\frac{7}{8}°$ positive camber box is followed until a box common to a horizontal row of boxes corresponding to the 3/16" toe-out box is found. The common box indicates that the shim identified by the number 304 must be used to achieve the desired camber and toe-out positions. The chart also indicates that the bolt-engaging notch marked "B" on the shim must be engaged with the upper right-hand reference bolt 28.

One preferred method of inserting the shim device 10 that ensures that the bolt-engaging notch identified as "B" engages the upper right-hand bolt is to hold the shim device with a pair of thin long-nosed pliers, tweezers or any other long-handled tool that will grip the shim. The shim is then inserted between the end plate of the axle and the wheel hub and the upper right-hand bolt is engaged by the tool that is holding the shim device. The shim device is then pulled back so that the notch engages the bolt and the bolts that have been removed are inserted back into their respective holes. This method is preferred since it is difficult to see the indicia that are on the shim when the wheel assembly is attached to the axle assembly.

The procedure to adjust camber and toe on the left rear wheel assembly is the same except that the side of the shim device facing the wheel mount assembly and the side of the shim device facing the axle assembly will be reversed. The reference bolt will change from the upper right-hand bolt to the upper left-hand bolt.

In the specific example given above, the tire is a 24 inch tire. For tire sizes of 22 inches, 8% is added to the initial toe reading since toe is a function of tire size. If the tire size is greater than 24 inches, such as 26 inches, 8% is deducted from the initial toe reading. If the tire size is 27 inches, 12% is deducted from the initial toe reading.

In the chart in FIG. 5, if a particular combination of camber/toe adjustment does not have a common block with indicia to designate a shim device 10, the nearest indicia-containing block should be consulted. In a situation wherein two indicia-containing blocks are within the same distance, the indicia-containing block having the closest toe value should be used.

As should be easily understood, the chart illustrated in FIG. 3 is an empirical chart that is based on the tapers of the series of shims in Table 1 which were designed for use on rear wheels of front-wheel drive cars such as a Citation manufactured by General Motors Corporation. For front-wheel drive mid-sized cars, for example, require shims of different sizes would be required along with a new chart.

If the use of a single shim device does not adjust the camber and toe the desired amount, two shim devices can be used in combination.

Although the present invention has been described with reference to preferred embodiments, workers skilled in the art will recognize that changes may be made in form and detail without departing from the spirit and scope of the invention.

What is claimed is:

1. In combination, a wheel assembly attached to an end of an axle assembly of a motor vehicle, the wheel assembly being attached to the axle assembly by a plurality of bolts parallel to and substantially equidistantly spaced from an axis of the wheel assembly but unequally from each other, a shim device for adjusting camber and/or toe of the wheel assembly, the shim device comprising: a relatively flat, tapered plate having a peripheral surface with a plurality of outwardly facing irregularly spaced bolt-engaging notches in excess of the number of bolts used to attach the wheel assembly to the axle assembly, the plate being installable between the axle and the wheel without complete removal of all the bolts and the plate having a sufficient diameter so that the bolt-engaging notches engage the bolts to retain the plate in position, and the bolt-engaging notches being circumferentially positioned so that the plate can be retained in any one of a plurality of closely spaced angular positions with respect to the bolts, the plate having a plurality of indexing indicia thereon to indicate when the plate is in the desired angular position.

2. The device of claim 1 wherein an inner edge of each bolt-engaging notch is spaced from a center of the plate at the same distance as the bolts are spaced from the axis of the wheel assembly.

3. The device of claim 2 wherein the plate is generally annularly configured.

4. In combination, a wheel assembly attached to an end of an axle assembly of a motor vehicle, the wheel assembly being attached to the axle assembly by a plurality of bolts parallel to and positioned in a spaced-apart relationship, a shim device for adjusting camber and/or toe of the wheel assembly, the shim device comprising:

a relatively flat, one piece tapered plate having a peripheral surface with a plurality of outwardly facing closely and irregularly spaced notches of greater number than the number of bolts used to attach the wheel assembly to the axle assembly for insertion substantially within the bolts and engaging the bolts, and means for facilitating separation of the plate into at least two portions so that each portion is insertable individually between the wheel assembly and the axle assembly, said means for facilitating separation of the plate into at least two portions including a first pair of slots extending sufficiently into the plate to facilitate splitting of the plate into at least two portions; and a second pair of slots extending sufficiently into the plate to facilitate splitting of the plate, which second pair of slots are disposed approximately 90° from the first pair of slots.

5. The device of claim 4 wherein the first pair of slots are diametrically opposed slots so that the plate is separated in substantially equal portions.

6. A method for installing a shim device for adjusting camber and/or toe of a wheel assembly attached to an axle assembly by a plurality of bolts, the shim device including a plate having a relatively flat taper and a peripheral surface having means for engaging the bolts and having irregularly spaced externally spaced notches for the device to be separated in at least two portions, the method comprising:

loosening all the bolts;

separating the shim device into a first and a second portion;

removing a sufficient number of first bolts to permit insertion of the first portion and leaving a remainder of the second bolts to hold the wheel assembly onto the axle assembly;

inserting the first portion of the shim device between the wheel assembly and the axle assembly at a selected angular position;

inserting the first bolts to hold the wheel assembly onto the axle assembly so that the means for engaging the bolts engages the first bolts;

removing a sufficient number of the second bolts so that the second portion of the shim device is insertable between the wheel assembly and the axle assembly;

inserting the second portion of the shim device between the wheel assembly and the axle assembly in mating relationship with the first portion;

inserting the second bolts to hold the wheel assembly onto the axle assembly so that the means for engaging the bolts engages the second bolts; and tightening all the bolts.

7. In combination, a wheel assembly attached to an end of an axle assembly of a motor vehicle, the wheel assembly being attached to the axle assembly by a plurality of bolts parallel to and positioned in a spaced-apart relationship, a shim device for adjusting camber and/or toe of the wheel assembly, the shim device comprising:

a relatively flat, tapered plate having a peripheral surface with a plurality of irregularly spaced, externally-facing bolt-engaging notches in excess of the number of bolts for retaining the tapered plate in a selected angular position with respect to the bolts, and the plate having selectively positioned indexing indicia corresponding to the bolt-engaging notches for indicating the relative angular position of the plate with regard to the bolts to provide a desired camber and/or toe.

8. A method of adjusting camber and/or toe of a wheel assembly attached to an axle assembly of a motor vehicle by a plurality of spaced bolts extending parallel to the axis of the axle assembly, and including a reference bolt, comprising the steps of:

(1) providing at least one shim including a relatively flat, tapered plate having a plurality of irregularly spaced external bolt-engaging notches designed to enable the shim to be placed in a number of selected angular positions with respect to the reference bolt, said plate having indexing indicia selectively positioned with respect to the bolt-engaging notches to indicate angular positioning of the plate with respect to the reference bolt;

(2) determining the position of the indexing indicia with respect to the reference bolt which corresponds to an angular orientation of the shim which provides a selected camber and/or toe adjustment; and (3) installing the shim between the wheel assembly and the axle assembly in engagement with the bolts, and with the bolt-engaging means in such a position with respect to the indexing indicia to provide the desired angular relation with the reference bolt and hence the desired camber and/or toe adjustment.

9. The method of claim 8 wherein a plurality of shims of different thicknesses are provided, each shim further having second indicia indicating the thickness of the shim, and determining which of the second indicia carried by the shim corresponds to a shim needed to provide the desired camber and toe setting.

10. A method of adjusting camber and/or toe of a wheel assembly attached to a motor vehicle axle assembly by a plurality of spaced bolts extending parallel to the axis of the axle assembly, using a plurality of shims of different thicknesses, each shim comprising a relatively flat, tapered plate having irregularly spaced bolt engaging notches for retaining the tapered plate in a predetemined angular a position with respect to the bolts, each shim having first indicia for indicating the thickness and hence taper of the shim, and having a plurality of spaced second indicia for indexing the angular positioning of the shim relative to the bolts, comprising the steps of:

determining the initial camber and toe setting of the wheel assembly and determining the adjustment needed to provide a desired camber and toe setting;

determining the proper shim and the proper angular position of the shim with respect to the bolts, respectively, which provides the desired camber and toe setting;

loosening all the bolts and removing a sufficient number of the bolts to permit insertion of the identified shim between the wheel assembly and the axle assembly;

inserting the selected shim between the wheel assembly and the axle assembly in the selected angular position;

inserting the removed bolts so that the bolt-engaging notches of the shim device engages the removed bolts; and tightening all the bolts to secure the wheel assembly to the axle assembly.

\* \* \* \* \*

UNITED STATES PATENT AND TRADEMARK OFFICE
CERTIFICATE OF CORRECTION

PATENT NO. : 4,684,150

DATED : August 4, 1987

INVENTOR(S) : John Specktor et al.

It is certified that error appears in the above-identified patent and that said Letters Patent is hereby corrected as shown below:

Column 8, line 44, after "angular", delete "a".

Signed and Sealed this

Nineteenth Day of January, 1988

Attest:

DONALD J. QUIGG

Attesting Officer

Commissioner of Patents and Trademarks